Dec. 2, 1952          G. F. SEES          2,619,765

ANIMAL TRAP

Filed Sept. 1, 1949

INVENTOR
GEORGE F. SEES

By

ATTORNEY

Patented Dec. 2, 1952

2,619,765

UNITED STATES PATENT OFFICE 2,619,765

ANIMAL TRAP

George F. Sees, Port Elgin, Ontario, Canada

Application September 1, 1949, Serial No. 113,552

5 Claims. (Cl. 43—64)

This invention relates to animal traps, and in particular to animal traps adapted to be used in association with a separate receptacle for collecting and/or killing the animals caught in the trap.

An object of this invention is to provide a novel and effective animal trap of the rotatable type which does not require to be set and is continuously ready for operation.

A further object of this invention is to provide an animal trap which is simpler in construction and more economical to make than those of the same type heretofore employed.

In drawings which illustrate embodiments of the invention,

Figure 1:
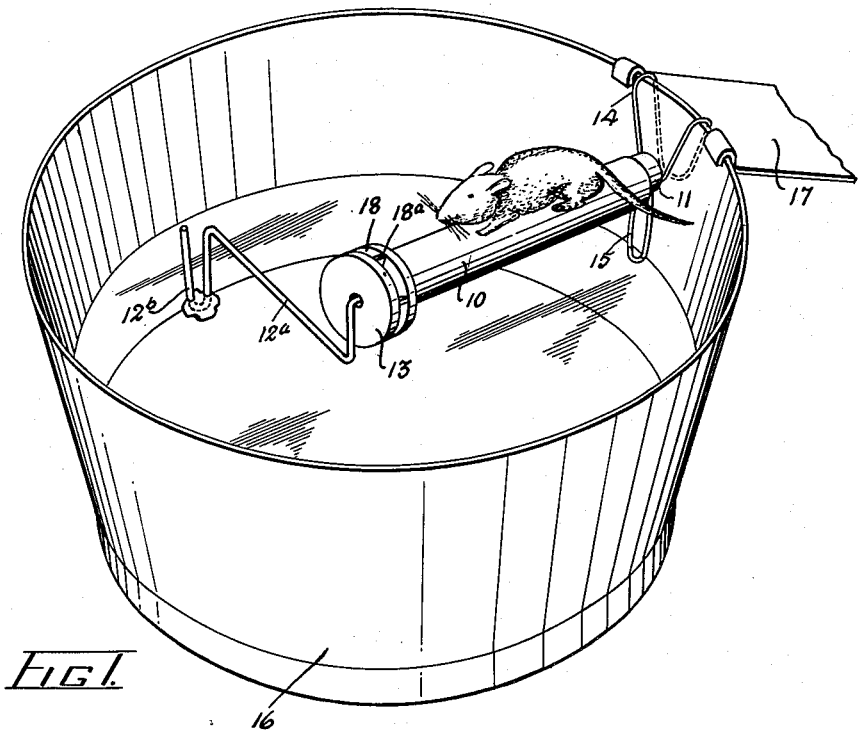
Fig. 1 is a perspective view of the animal trap attached to a receptacle for use and showing an animal on the runway of the trap.
Figure 2:
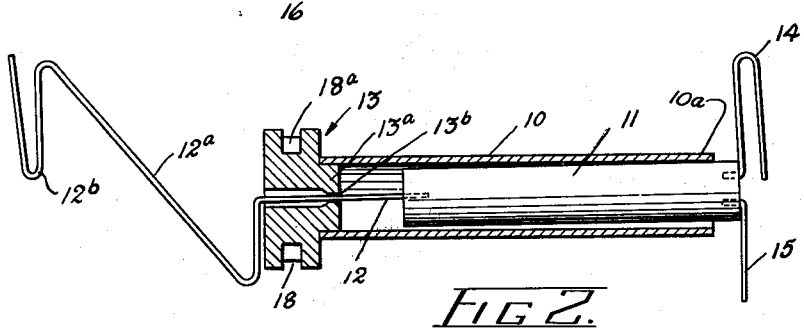
Fig. 2 is a cross-sectional view of the trap.

The mouse trap comprises a rotatable cylindrical shell 10, having a regular smooth outer runway surface, and a friction cylinder 11 extending loosely within the shell 10 for the major portion of the length of the shell and having a wire pivot member 12 protruding from the center of one end. At one end of the shell 10 a main bait holder 13, serving as an end supporting member for the shell, is secured by suitable means, as by means of a cylindrical extension 13ª of the bait holder fitting snugly within the end of the shell 10, the shell with its end supporting member providing a runway for an animal. The pivot member 12 extends through a central bearing hole 13ᵇ in the main bait holder 13 and is bent downwardly at a right angle to retain the runway rotatably on the friction cylinder and the pivot member, the friction cylinder 11 combined with the pivot member 12 constituting a shaft for the runway. The bearing portion of the bearing hole 13ᵇ is preferably made short axially to reduce friction, and the remainder of the hole is enlarged. Pivot member 12 may have a further extension 12ª which is carried upward at an angle and is bent in the form of a hook 12ᵇ to act as a supplemental bait holder.

The relative diameters of the cylindrical shell 10 and of the friction cylinder 11 are such that there is normally a slight angle between the axis of the runway and the axis of the cylinder whereby the end 10ª of the runway remote from the bait holder 13 will be in contact with friction cylinder 11 while the remainder of the shell will be spaced from the cylinder, the weight of the runway being supported partially at the end 10ª by the friction cylinder at the area of frictional contact therewith, and partially at the other end of the runway by the pivot member 12 at the area of relatively non-frictional contact with bearing hole 13ᵇ.

The main bait holder 13 is provided with a circumferential slot 18 which may be divided into convenient compartments by radial partitions 18ª. Suitable bait is pressed into the compartment of the slot 18 to attract the animals. In addition, a type of bait having an effective odour may be engaged on the supplementary bait holder 12ᵇ to provide an additional attraction.

In the operation of the trap, the animal is lured by the bait to the rim of the receptacle 16 and out on to the runway. When an animal is on the runway near the end 10ª thereof, the frictional resistance to rotation caused by the contact between the runway and the cylinder is significantly accentuated by the force of gravity resulting from the weight of the animal and mainly exerted on the point of frictional contact, at which the friction between the runway and the pivot member, tending to resist rotation of the runway, will act to resist such rotation through a radial distance (the inner radius of the runway) which is almost as great as the radial distance (the outer radius of the runway) through which act the turning moments tending to cause rotation of the runway and produced by the animal being off balance to any degree, whereby the runway will be prevented from rotating under the weight of the animal. When, however, the animal has advanced toward the bait holder 13 and reached a point beyond the middle of the runway, the major proportion of the forces resulting from the weight of the animal will be exerted on the relatively non-frictional area point of contact between bearing hole 13ᵇ and pivot member 12. At the location of this area the radius of the bearing hole 13ᵇ, which is the radius of the inner surface of the runway which bears on the pivot member at that location, is very small compared to the outer radius of the runway at the same location, whereby the friction between the runway and the pivot member, tending to resist rotation of the runway, will act to resist such rotation through a much smaller radial distance (the radius of the bearing hole) than the radial distance (the outer radius of the runway) through which act the turning forces which are certain to be produced by laterally directed unbalanced movements of the animal. At the same time the frictional resistance to rotation of the runway caused by contact between the end 10ª of the runway and the friction cylinder will be less as the weight of the animal is transferred to the other end of the runway. The resistance to rotation of the runway will continually decrease as the animal approaches the bait holder, and the slightest laterally-directed movement of the animal will result in the runway rotating on its shaft, causing the animal to lose its hold on the smooth runway and fall into the receptacle 16.

Figure 3:
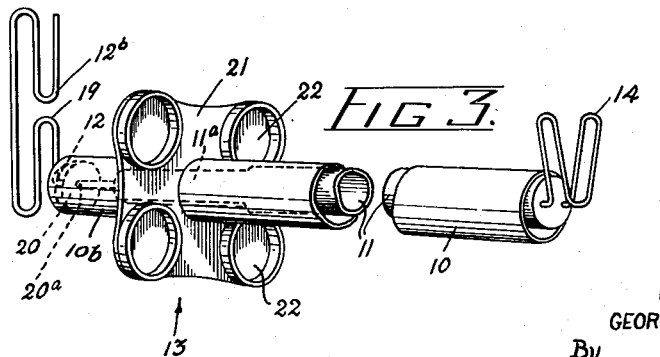
Fig. 3 is a perspective view, partly broken away, of a modified form of the animal trap.

The above described embodiment of the invention is suitable for small animals such as mice when the trap is light in weight and may easily be supported by the hook 14 at one end. A large size of trap, suitable for catching rats and similar larger animals, is provided with a pivot member 12 which is bent to form a second hook 19 for engagement with the side of the receptacle 16 opposite to the side on which the hook 14 engages the pail, and brace 15 is eliminated. This is shown in the embodiment illustrated in Fig. 3, which is further modified by the provision of an extension 10ᵇ on the cylindrical shell 10 beyond bait carrier 13, the bearing for pivot member 13 being supplied by a disc 20 having a central hole 20ª fitted within the shell extension 10ª. An extension 11ª of friction cylinder 11 may be provided to permit pivot member 13 to be as short as possible within the shell 10 and reduce the danger of bending the wire pivot member. The top and bottom of extension 11ª is flattened to space it from the inner surface of the shell 10. The bait carrier 13 in this embodiment is constituted by a flange 21 having bait cups 22 on the side of the flange facing runway 10, whereby the bait is more easily accessible from that side and the animals are discouraged from approaching the bait carrier 11 in the opposite direction. In operation, the embodiment shown in Fig. 3 is the same as the smaller embodiment above described.

It will be noted that the mouse trap according to the invention is continually in a set position and requires no adjustment during use. Only one moving part is required, and the construction is adapted for convenient manufacture from inexpensive materials.

It is thought that the construction and use of the invention will be apparent from the above description of the various parts and their purpose. It is to be understood that the form of the invention herewith shown and described is to be taken as a preferred example of the same and that various changes in the shape, size and arrangement of parts may be resorted to, without departing from the spirit of the invention or the scope of the subjoined claims.

What I claim as my invention is:

1. An animal trap comprising a receptacle, a support associated with the receptacle including a shaft having one of its ends mounted on the receptacle, said shaft extending from one wall of the receptacle toward the central portion thereof, a tubular member having its opposite ends rotatably mounted on the shaft, one of said ends being eccentrically mounted and the other of said ends being concentrically mounted on the shaft for rotation relative thereto, whereby an animal moving along the upper surface of the tubular member from the eccentric end thereof toward the concentric end thereof will cause rotation of the tube and discharge of the animal into the receptacle.

2. An animal trap adapted to be associated with a receptacle and comprising an elongated shaft of substantially circular cross section, means for supporting the shaft in a substantially horizontal position on a wall of the receptacle with the shaft extending toward the central portion of the receptacle, the shaft having at one end near the said supporting means a friction member portion and having at the other end a pivot extension of materially smaller diameter than the friction member portion, a tubular runway having one end adapted to be disposed near the wall of the receptacle so as to be accessible to an animal and being rotatable on the shaft around a longitudinal axis of rotation, the runway having an inner diameter larger than the outer diameter of the shaft at corresponding locations along the length of each, the inner surface of the runway being in supporting contact with the friction member portion of the shaft at the said near end of the runway and with the pivot extension of the shaft at the other end of the runway for supporting the runway rotatably on the shaft, the thickness of the tubular wall of the runway at the said near end being materially less than the said thickness of the said other end of the runway, and bait holding means adjacent the said other end of the runway.

3. An animal trap adapted to be associated with a receptacle and comprising an elongated friction member of substantially circular cross section, means for supporting the friction member in a substantially horizontal plane on a wall of the receptacle so that the friction member extends from the wall towards the central portion of the receptacle, a pivot member extending from one end of the friction member and being of a diameter materially less than the diameter of the friction member, and a substantially tubular runway disposed for rotation on the friction member and having one end adapted to be disposed near the said wall of the receptacle so as to be accessible to an animal, the runway having at the other end an end-supporting portion providing a co-axial bearing hole of materially smaller diameter than the inner diameter of the runway at the first mentioned end thereof, the said inner diameter of the runway at the first mentioned end being materially greater than the outer diameter of the friction member, the friction member supporting the said first mentioned end of the runway and the pivot member extending through the bearing hole and supporting the said other end of the runway, for rotation of the runway on the friction member.

4. An animal trap adapted to be associated with a receptacle having a side wall and having a tubular runway accessible to an animal, the runway comprising a cylindrical runway shell having at one end an end-supporting member providing a co-axial bearing hole of materially smaller diameter than the inner diameter of the runway shell at the other end thereof, a shaft extending loosely through the runway and supporting the runway for rotation on the shaft, the shaft including a friction cylinder located within and supporting the said other end of the runway shell and a pivot member of materially smaller diameter extending co-axially from one end of the friction cylinder and extending through the bearing hole in the end supporting member, the diameter of the friction cylinder being materially less than the inner diameter of the runway at the said other end of the runway, and means for supporting the shaft in a substantially horizontal position on the upper edge of the wall of the receptacle with the shaft extending from the wall toward the center of the receptacle, the runway being supported against gravity by contact with the friction cylinder and the pivot member at the ends of the runway and being spaced from the shaft between the said positions of contact.

5. An animal trap adapted to be associated with a receptacle and having a tubular runway which comprises a cylindrical runway shell accessible to an animal and an end-supporting member at one end of the shell, the end-supporting member being substantially disc-shaped and having a co-axial central bearing hole of materially smaller diameter than the inner diameter of the runway, a shaft extending loosely through the runway and supporting the runway for rotation on the shaft, the shaft including a friction cylinder located within and supporting the other end of the shell and a wire pivot member of materially smaller diameter co-axially mounted on one end of the friction cylinder and extending through the bearing hole in the end supporting member, the diameter of the friction cylinder being materially less than the inner diameter of the runway at the said other end of the runway, and means for supporting the shaft in a substantially horizontal position on a wall of the receptacle with the shaft extending from the wall toward the central portion of the receptacle, the runway being supported against gravity by contact with the friction cylinder and the pivot member at the ends of the runway only and being spaced from the shaft between the said positions of contact.

GEORGE F. SEES.

REFERENCES CITED

The following references are of record in the file of this patent:

UNITED STATES PATENTS

| Number | Name | Date |
|---|---|---|
| 2,110,678 | Robbins | Mar. 8, 1938 |